United States Patent
Zhang et al.

(10) Patent No.: US 9,598,954 B1
(45) Date of Patent: Mar. 21, 2017

(54) DUAL-MODE CASING COLLAR LOCATOR (CCL) TOOL, MODE SELECTION CIRCUIT AND METHOD

(71) Applicant: Penny Technologies

(72) Inventors: Dalong Zhang, Sugar Land, TX (US); Bulent Finci, Sugar Land, TX (US); George Innes, III, Houston, TX (US)

(73) Assignee: Penny Technologies c/o Vistra, Luxembourg (LU)

( * ) Notice: Subject to any disclaimer, the term of this patent is extended or adjusted under 35 U.S.C. 154(b) by 0 days.

(21) Appl. No.: 15/184,465

(22) Filed: Jun. 16, 2016

(51) Int. Cl.
*G01V 3/18* (2006.01)
*E21B 47/09* (2012.01)
*G01V 3/26* (2006.01)

(52) U.S. Cl.
CPC ............ *E21B 47/0905* (2013.01); *G01V 3/26* (2013.01)

(58) Field of Classification Search
CPC ... G01V 3/28; G01V 3/30; G01V 3/38; G01V 3/08; G01V 3/26; E21B 47/0905
USPC .................................................. 324/346, 328
See application file for complete search history.

(56) References Cited

U.S. PATENT DOCUMENTS

| | | | |
|---|---|---|---|
| 3,434,046 A | 3/1969 | Wilson et al. | |
| 5,720,345 A | 2/1998 | Price et al. | |
| 6,032,739 A * | 3/2000 | Newman | E21B 29/02 |
| | | | 166/255.2 |
| 6,768,299 B2 | 7/2004 | Almaguer | |
| 7,073,582 B2 * | 7/2006 | Connell | E21B 47/044 |
| | | | 166/113 |
| 2014/0216734 A1 | 8/2014 | Hupp | |

* cited by examiner

*Primary Examiner* — Reena Aurora
(74) *Attorney, Agent, or Firm* — Egan, Peterman, Enders & Huston LLP.

(57) ABSTRACT

Provided herein are various embodiments of casing collar locator (CCL) tools, circuits and methods, which enable a CCL tool to selectively operate in passive or active mode. More specifically, a dual-mode CCL tool is provided herein with a mode selection circuit, which may be coupled between a coil of the CCL tool and a wireline of a well survey system. The mode selection circuit may be generally configured to detect a voltage on the wireline, connect the coil of the CCL tool to the wireline if the detected voltage is less than a threshold voltage, and connect the coil of the CCL tool to an amplifier circuit if the detected voltage is greater than or equal to the threshold voltage. The mode selection circuit described herein therefore enables a single CCL tool to be used for a variety of different downhole operations, including but not limited to wireline logging and well perforation jobs.

24 Claims, 4 Drawing Sheets

DUAL-MODE CASING COLLAR LOCATOR (CCL) TOOL, MODE SELECTION CIRCUIT AND METHOD

BACKGROUND OF THE INVENTION

1. Field of the Invention

This invention generally relates to casing collar locator (CCL) tools and, more specifically, to circuits and methods for selectively operating a CCL tool in passive or active mode.

2. Description of the Related Art

The following descriptions and examples are not admitted to be prior art by virtue of their inclusion within this section.

Wells are drilled for a variety of reasons, including the extraction of a natural resource such as ground water, brine, natural gas, or petroleum, for the injection of a fluid to a subsurface reservoir or for subsurface evaluations. Before it can be employed for its intended use, a well must be prepared for its objective after it has been drilled. The preparation is generally referred to in the industry as the "well completion phase," and may include casing the borehole of the well to prevent collapse, as well as other processes specific to the objective of the well and/or the geomechanical properties of the rock in which the well is formed. For example, typical well completion processes for oil and gas wells may include perforating, hydraulic fracturing and/or acidizing.

After a borehole is drilled, the well may be cased by inserting sections of metal pipe or "casing strings" into the borehole, and connecting end segments or "joints" of the casing strings together to form a well casing. Each section of metal pipe or "casing string" may generally have the same length. In some cases, the joints may be threaded and coupled together using metal couplings called "collars" or "casing collars." Once a casing collar has been threaded onto an end section of pipe, another section of pipe may be inserted into the borehole and threadably coupled to the casing collar.

In this manner, a cased well may include a plurality of stacked casing strings, which are coupled together at each end segment or joint by a casing collar. Inclusion of the casing collar increases the thickness of the well casing at the location of the casing collar joint. In some cases, an air gap may also exist at the casing collar joint between the ends of adjacent casing strings. As described in more detail below, the increase in metal thickness and/or the air gap at the casing collar joint may produce a magnetic field disturbance, which may be detected by a casing collar locator (CCL) tool.

In some cases, a cased well may be perforated to establish a flow path to formations outside of the wellbore. In the oil and gas industry, for example, a hole or perforation may be punched in the well casing to connect the well to a reservoir. In perforation jobs, a perforation gun (i.e., a string of explosive charges) is lowered into the borehole down to a desired depth and fired to perforate the well casing at that depth. Perforation guns are commonly run on wirelines (i.e., a steel cable encompassing power and data lines), so that electrical signals from the surface can be used to fire the guns.

Well logging, also known as borehole logging or wireline logging, is the process of generating a detailed record (referred to as a "well log") of the geologic formations penetrated by the borehole. Some types of well logs can be done during any phase of the well, including drilling, completing, producing or abandoning. The oil and gas industry uses wireline logging to obtain a continuous record of the geomechanical properties of the rock in which the well is formed as a function of borehole depth. Wireline logging is generally performed by lowering a logging tool (i.e., a string of one or more borehole instruments) on the end of a wireline into a borehole and recording measurements obtained from a variety of instruments. The measurement data can be recorded either at the surface (real-time mode) or in the borehole (memory mode). Real-time data is recorded directly against measured borehole depth. On the other hand, memory data is recorded and depth data is measured simultaneously against time, and the two data sets are merged using the common time base to create an instrument response vs. depth log. Wireline logging may be performed before the well is cased to generate "open hole logs," or after the well is cased to generate "cased-hole logs."

Casing collar locating (CCL) tools are widely used for depth control and to correlate tool string positioning with other depth based logs during cased-hole logging and perforation operations. A CCL tool is an electromagnetic measurement device, which may be attached to a downhole tool and lowered into a borehole for detecting the presence of casing collar joints or other magnetic anomalies. As the CCL tool is lowered into the borehole, the borehole depth can be calculated by counting the number of casing collar joints detected by the CCL tool and summing the individual lengths of casing strings located between each detected joint. By correlating this calculated depth against a depth control log, which precisely shows the depth of each casing collar joint, the location of the downhole tool can be accurately determined. This enables the measurement data in cased-hole logs to be accurately correlated to borehole depth, and also enables precise positioning of perforation guns.

There are two different basic types of CCL tools: passive CCL tools and active CCL tools. The basic components of each type of CCL tool are the same and generally include at least one winding or coil, which is arranged next to at least one magnet (e.g., a permanent magnet or an electromagnet). When an active or passive CCL tool is lowered through a cased well, the magnetic field surrounding the CCL tool is disturbed when a change occurs in the effective magnetic permeability of its surroundings (e.g., in the presence of a casing collar joint, an air gap between casing strings or other anomalous features of the pipe). The change in magnetic field causes electrical pulses to be generated in the coil. In passive CCL tools, the coil is directly connected to the wireline and the electrical pulses are detected and recorded by equipment coupled to the wireline at the surface. In active CCL tools, an electrical circuit is coupled between the coil output and the wireline for amplifying the electrical pulses, and then either: coupling the analog signal to the wireline, or digitizing the signal and transmitting the digitized signal up the wireline. In active CCL tools, power is required from surface equipment to power the electrical circuit processing the detected signals.

Passive and active CCL tools have different advantages and limitations, and thus, are generally preferred for different types of borehole operations. Since passive CCL tools do not require power, they are typically preferred for use during perforation jobs because of safety concerns with inadvertent detonation of the explosive charges. On the other hand, active CCL tools are typically preferred for use during logging operations, since they usually have little to no DC current load (i.e., draw less current), and therefore, won't saturate the coil at higher logging speeds. Due to the costs associated with purchasing, maintaining and storing different types of CCL tools, it would be advantageous to provide a single CCL tool that can be selectively configured to operate in both passive and active modes.

SUMMARY OF THE INVENTION

The following description of various embodiments of circuits, casing collar locator (CCL) tools and methods for selectively operating a CCL tool in either passive or active mode is not to be construed in any way as limiting the subject matter of the appended claims.

According to one embodiment, a circuit referred to herein as a "mode selection circuit" is provided and coupled between a coil of a CCL tool and a wireline of a well survey system. The mode selection circuit may be configured for selectively operating a CCL tool in either passive or active mode. A CCL tool configurable to operate in passive or active mode is referred to herein as a "dual-mode CCL tool."

According to one embodiment, the mode selection circuit may include a first switch, which is coupled between the wireline and the coil of the dual-mode CCL tool, a threshold detection circuit having an input coupled to detect a voltage on the wireline and an output coupled to the first switch, and an amplifier circuit coupled between the wireline and the coil of the CCL tool.

The threshold detection circuit may be generally configured for supplying a signal to the first switch to selectively deactivate (or activate) the first switch depending on whether the detected voltage exceeds (or is less than) a threshold voltage. Although not limited to such, the threshold voltage may range between about 10V and about 30V, and may be about 20V, in one example. However, the threshold voltage is not limited to any particular value, and may alternatively comprise any voltage magnitude deemed appropriate to switch the operation of the dual-mode CCL tool between passive and active modes.

In one embodiment, the first switch may be a normally closed switch. If the voltage detected by the threshold detection circuit does not exceed the threshold voltage, the coil may be connected to the wireline via the normally closed first switch, and a detection signal proportional to an output voltage generated across the coil may be supplied directly to the wireline via the first switch. If the detected voltage exceeds the threshold voltage, the threshold detection circuit may supply a signal to the first switch to disconnect the coil from the wireline. In one embodiment, the amplifier circuit may supply an amplified detection signal to the wireline that is proportional to an output voltage generated across the coil, if the signal is supplied to the first switch to disconnect the coil from the wireline.

In another embodiment, the mode selection circuit may include a second switch, which is coupled between the coil of the CCL tool and the amplifier circuit. In one embodiment, the first switch may be a normally closed switch and the second switch may be a normally open switch. If the voltage detected by the threshold detection circuit does not exceed the threshold voltage, the coil may be connected to the wireline via the normally closed first switch, and a detection signal proportional to an output voltage generated across the coil may be supplied directly to the wireline via the first switch. If the detected voltage exceeds the threshold voltage, the threshold detection circuit may supply a first signal to the first switch to disconnect the coil from the wireline and a second signal to the second switch to connect the coil to the amplifier circuit. The amplifier circuit may then supply an amplified detection signal to the wireline that is proportional to an output voltage generated across the coil.

In one embodiment, the threshold detection circuit may include a rectifier circuit, a current limiting circuit and a driver circuit. The rectifier circuit may be coupled to the wireline for converting the voltage on the wireline to a positive direct current (DC) voltage, thereby ensuring that the mode switching circuit can operate with both positive and negative wireline DC power. The current limiting circuit may be coupled for receiving the DC voltage from the rectifier circuit, and may be configured for generating a drive current. The driver circuit may be coupled for receiving the drive current from the current limiting circuit, and may be configured for supplying the signal to the first switch to disconnect the coil from the wireline only if the drive current received by the driver circuit is sufficient to activate the driver circuit. As used herein, the term "sufficient to activate" means that the drive current supplied to the driver circuit is greater than or equal to a turn-on characteristic of the driver circuit. Thus, the driver circuit may supply the signal to the first switch only when supplied with a drive current that is equal to or exceeds the turn-on characteristic specified for the driver circuit. According to one embodiment, the threshold voltage used by the threshold detection circuit to disconnect the coil from the wireline may be determined by the drive current generated by the current limiting circuit, the turn-on characteristic of the driver circuit and a turn-on characteristic of the first switch.

In some embodiments, one or more additional circuit elements may be coupled to the amplifier circuit for powering the amplifier, supplying the amplified detection signal to the wireline and/or protecting the amplifier from high wireline voltages or high output voltages generated across the coil of the CCL tool.

In one embodiment, an optional voltage step down circuit may be coupled between the wireline and the amplifier circuit to protect the amplifier circuit from high wireline voltages. If the voltage on the wireline exceeds a predetermined voltage, the voltage step down circuit may reduce the voltage on the wireline before supplying the reduced voltage to a power supply input of the amplifier. However, the voltage step down circuit may not be needed in all embodiments, and may be omitted if the amplifier circuit can withstand high wireline voltages without damage. In one alternative embodiment, a DC power supply may be coupled for supplying a voltage to the power supply input of the amplifier. In another alternative embodiment, the power supply input of the amplifier circuit may be coupled to the wireline for receiving the wireline voltage.

In one embodiment, a voltage clipping circuit may be coupled between the coil of the CCL tool and the amplifier circuit to protect the amplifier circuit from high output voltages, which may be generated across the coil of the CCL tool. If an output voltage generated across the coil exceeds a predetermined voltage, the voltage clipping circuit may be configured to clip the output voltage and supply the clipped voltage to a detection signal input of the amplifier circuit. However, the voltage clipping circuit may not be needed in all embodiments.

According to another embodiment, a method is provided herein for selectively operating a dual-mode CCL tool in either an active mode or a passive mode. In general, the method may begin by detecting a voltage on the wireline and comparing the wireline voltage to a threshold voltage. As noted above, the threshold voltage may comprise any voltage magnitude deemed appropriate to switch the CCL tool operation between passive and active modes.

If the detected voltage is less than the threshold voltage, the method may connect the coil of the dual-mode CCL tool directly to the wireline to operate the dual-mode CCL tool in passive mode. According to one embodiment, if the detected voltage is less than the threshold voltage, the coil may be connected directly to the wireline by closing a first switch, which is coupled between the wireline and the coil of the CCL tool. In one particular embodiment, the first switch may be a normally closed switch, and the coil may be connected directly to the wireline by maintaining the normally closed position of the first switch when the detected voltage is less than the threshold voltage.

If the detected voltage is greater than or equal to the threshold voltage, the method may connect the coil of the dual-mode CCL tool to an amplifier circuit to operate the dual-mode CCL tool in active mode. In some embodiments, the coil may be connected to the amplifier circuit by opening the first switch. In other embodiments, the coil may be connected to the amplifier circuit by opening the first switch and closing a second switch, which is coupled between the coil of the CCL tool and the amplifier circuit.

According to another embodiment, a dual-mode CCL tool is provided herein as including at least one magnet, at least one coil arranged next to the at least one magnet, and a mode selection circuit coupled between the at least one coil and the wireline of a well survey system. In general, the mode selection circuit may be configured to detect a voltage on the wireline, connect the at least one coil to the wireline if the detected voltage is less than a threshold voltage, and connect the at least one coil to an amplifier circuit if the detected voltage is greater than or equal to the threshold voltage. Although not strictly limited to such, the dual-mode CCL tool may preferably include at least one magnet, but only one coil. The single coil of the dual-mode CCL tool may be isolated from the wireline during the active mode of operation by disconnecting the coil from the wireline.

In some embodiments, the mode selection circuit may include a first switch coupled between the wireline and the at least one coil of the CCL tool, and a threshold detection circuit having an input coupled to detect the voltage on the wireline and having an output coupled to the first switch. In such embodiments, the threshold detection circuit may be configured to maintain the first switch in a normally closed position to connect the at least one coil to the wireline if the detected voltage is less than a threshold voltage, and supply a signal to the first switch to disconnect the at least one coil from the wireline if the detected voltage exceeds the threshold voltage.

In other embodiments, the mode selection circuit may include a first switch coupled between the wireline and the at least one coil of the CCL tool, a second switch coupled between the at least one coil of the CCL tool and the amplifier circuit, and a threshold detection circuit having an input coupled to detect the voltage on the wireline and having an output coupled to the first switch and the second switch. In such embodiments, the threshold detection circuit may be configured to supply a first signal to the first switch to disconnect the at least one coil from the wireline and a second signal to the second switch to connect the at least one coil to the amplifier circuit if the detected voltage exceeds the threshold voltage.

In either embodiment, if the detected voltage is less than the threshold voltage, a detection signal proportional to an output voltage generated across the at least one coil may be supplied to the wireline via the first switch. On the other hand, if the detected voltage is greater than or equal to the threshold voltage, the amplifier circuit may be coupled to supply an amplified detection signal to the wireline that is proportional to an output voltage generated across the at least one coil.

BRIEF DESCRIPTION OF THE DRAWINGS

Other objects and advantages of the invention will become apparent upon reading the following detailed description and upon reference to the accompanying drawings in which.

Figure 1:
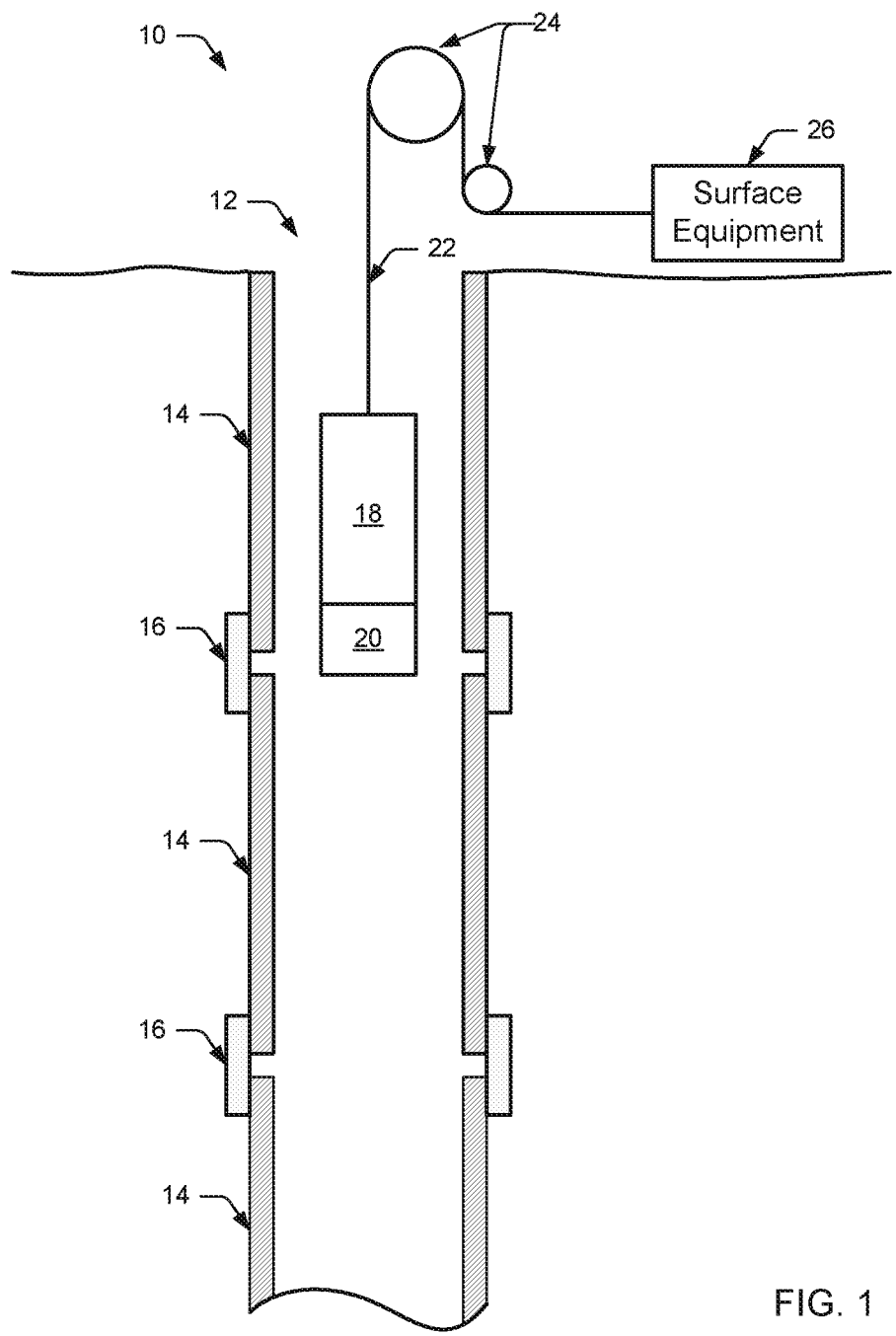
FIG. 1 is a block diagram illustrating an embodiment of a well survey system in which a casing collar locator (CCL) tool is suspended from a wireline and used to detect magnetic anomalies in a cased well.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The present disclosure provides embodiments of casing collar locator (CCL) tools, circuits and methods, which enable a CCL tool to selectively operate in passive mode or active mode. A CCL tool configurable to operate in passive or active mode is referred to herein as a "dual-mode CCL tool." The dual-mode CCL tool, circuits and methods described herein provide an advantage over conventional CCL tools by providing a single tool that can selectively operate in either passive or active mode. A CCL tool with dual-mode functionality is desirable, since it reduces the cost typically associated with purchasing, maintaining and storing different types of CCL tools, which are generally preferred for different types of downhole operations (such as wireline logging and perforation jobs). In some cases, the circuit embodiments described herein may be used to retrofit commercially available passive CCL tools to enable those tools to selectively operate in either passive or active mode. The circuit embodiments described herein may be used in conjunction with a CCL tool having any number and configuration of magnetic elements and any number and configuration of coils. Accordingly, the disclosed circuit embodiments may be used in conjunction with, or to retrofit, any passive CCL tool design.

FIG. 1 is a diagram illustrating an embodiment of a well survey system 10 in which a casing collar locator (CCL) tool 20 is used to detect magnetic anomalies in a cased well 12. In the particular embodiment shown in FIG. 1, CCL tool 20 is mounted onto a downhole tool 18 and lowered down into cased well 12 via a wireline 22 and pulley system 24. In addition to lowering the downhole tool 18 and CCL tool 20 into the cased well, wireline 22 may also provide power and data lines to/from the downhole and CCL tools and the surface.

As noted above, cased well 12 may typically include a plurality of stacked casing strings 14, which are identical in length and coupled together at each end segment or joint. In some cases, the casing strings 14 may be coupled together at the joint ("casing collar joint") by a casing collar 16, as shown in FIG. 1. If included, casing collar 16 increases the overall thickness of the well casing at the casing collar joint between adjacent end segments. In other cases, end segments of the casing strings 14 may be threaded at the casing collar joint, allowing the stacked casing strings to be coupled together without the use of casing collars 16. In some cases, an air gap may also exist at the casing collar joint. Although cased well 12 is illustrated as being substantially vertical in FIG. 1, the CCL tool 20, circuits and methods described herein are not limited to use within substantially vertical wells and may be utilized within any well configuration.

In some embodiments, the well survey system 10 shown in FIG. 1 may be a wireline survey system. In a wireline survey system, downhole tool 18 and CCL tool 20 may be conveyed into the borehole after the borehole has been drilled and at least partially cased. In particular, downhole tool 18 and CCL tool 20 may be suspended by wireline 22 and may be raised and lowered via pulley system 24 to obtain discrete measurements at various locations within the borehole. In addition to the depth measurements recorded by CCL tool 20, downhole tool 18 may include various sensors and/or instruments for measuring gamma ray, cement bond, etc. The discrete measurements obtained by downhole tool 18 and CCL tool 20 may be stored downhole and/or transmitted to the surface, where they can be plotted to map the actual borehole path.

In some embodiments, downhole tool 18 may comprise a perforation gun in addition to, or instead of, the various sensors and instruments, which are used to obtain measurement data during and/or after drilling operations. In some situations, it may be desirable to perforate the well casing to connect the well to a reservoir. To perforate the well casing, a perforation gun (not shown in FIG. 1) comprising a string of explosive charges may be lowered into the borehole via wireline 22 and pulley system 24. Although not limited to such, the perforation gun may be attached to the downhole tool 18 downstream or on the downhole side of CCL tool 20. Upon reaching a desired depth, the perforation gun may be fired to perforate the well casing at that depth. In some cases, electrical signals from the surface can be transmitted along the wireline 22 to fire the perforation gun once the desired depth is reached.

As shown in FIG. 1, surface equipment 26 may be included at the surface for receiving the measurement data, which is transmitted electronically over wireline 22 from downhole tool 18 and/or CCL tool 20. In one example, surface equipment 26 may include a wireline receiver, which is coupled to receive the transmitted measurement data, and a memory coupled to store the transmitted measurement data. In some cases, surface equipment 26 may include a processing device and program instructions, which when executed by the processing device correlate the received measurement data with a depth log stored within the surface equipment 26 and/or a wireline depth measured by a separate depth measurement device (not shown). In some cases, a power source may be included within the surface equipment 26 for supplying power over wireline 22 to downhole tool 18 and/or to CCL tool 20 (e.g., when CCL tool 20 is be operated in active mode). In some cases, the same power source (or a different power source) may be used to fire a perforation gun by transmitting electrical signals via the wireline 22.

In general, CCL tool 20 may include at least one winding or coil, which is arranged next to at least one magnet (e.g., a permanent magnet or an electromagnet). In the exemplary embodiment shown in FIG. 2, CCL tool 20 is illustrated as comprising a pair of magnets 28 arranged with like poles opposing one another, and a single winding or coil 30, which is wound around a bobbin 32 coupled between the pair of magnets 28. Although such an embodiment may be preferred due do its relatively small size, CCL tool 20 is not limited to any particular number and/or configuration of magnets and coils. In general, CCL tool 20 may be any passive CCL tool design, which is commercially available or known in the art.

Figure 2:
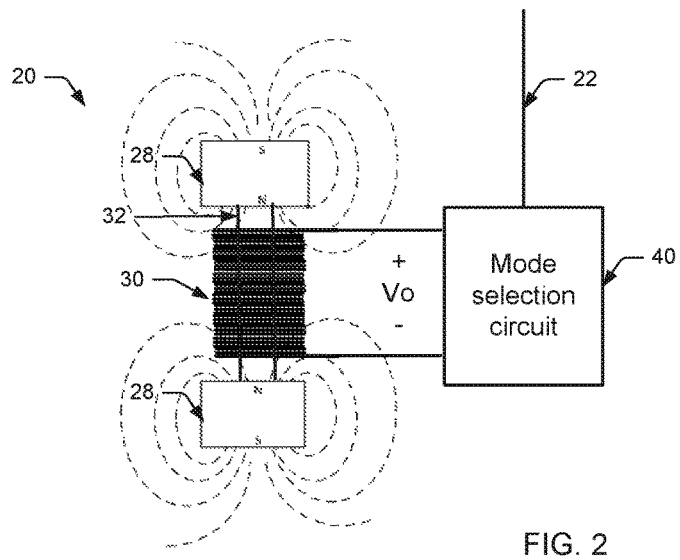
FIG. 2 is a block diagram of a mode selection circuit, which is coupled between the wireline and an exemplary CCL tool for selectively operating the CCL tool in either an active mode or passive mode.

When CCL tool 20 is lowered through cased well 12, the magnetic flux field surrounding the tool is disturbed when a change occurs in the effective magnetic permeability of its surroundings. In some cases, disturbances in the magnetic flux field may be due to changes in the geometry of the well casing, the presence of a casing collar joint, an air gap (g) between casing strings or other anomalous features of the well casing, such as heavy pitting, cracks or perforations. As shown in FIG. 2, a change in the magnetic flux field causes an output voltage (Vo) proportional to the magnetic disturbance to be generated across the ends of coil(s) 30. In conventional CCL tools, the generated output voltage (Vo) would be coupled directly to wireline 22, if the CCL tool were a passive device. Alternatively, the output voltage (Vo) would be amplified and possibly digitized before transmission on wireline 22, if the CCL tool were a conventional active device.

The embodiment shown in FIG. 2 improves upon conventional CCL tools and methods for detecting anomalous features of a well casing by providing and coupling a mode switching circuit 40 between the coil(s) 30 of the CCL tool 20 and the wireline 22 of well survey system 10. Unlike most convention CCL tools, mode switching circuit 40 enables CCL tool 20 to selectively operate in either passive or active mode. This enables a single CCL tool to be used for both logging and perforation operations, while reducing the costs typically associated with purchasing, maintaining and storing different types of CCL tools. In some embodiments, a dual-mode CCL tool comprising mode selection circuit 40 may be provided to a customer as an integrated product. In other embodiments, a commercially available passive CCL tool design may be retro-fitted with the mode selection circuit 40 described herein to convert the once passive CCL tool into a dual-mode CCL tool configured to selectively operate in passive or active mode.

Figure 3:
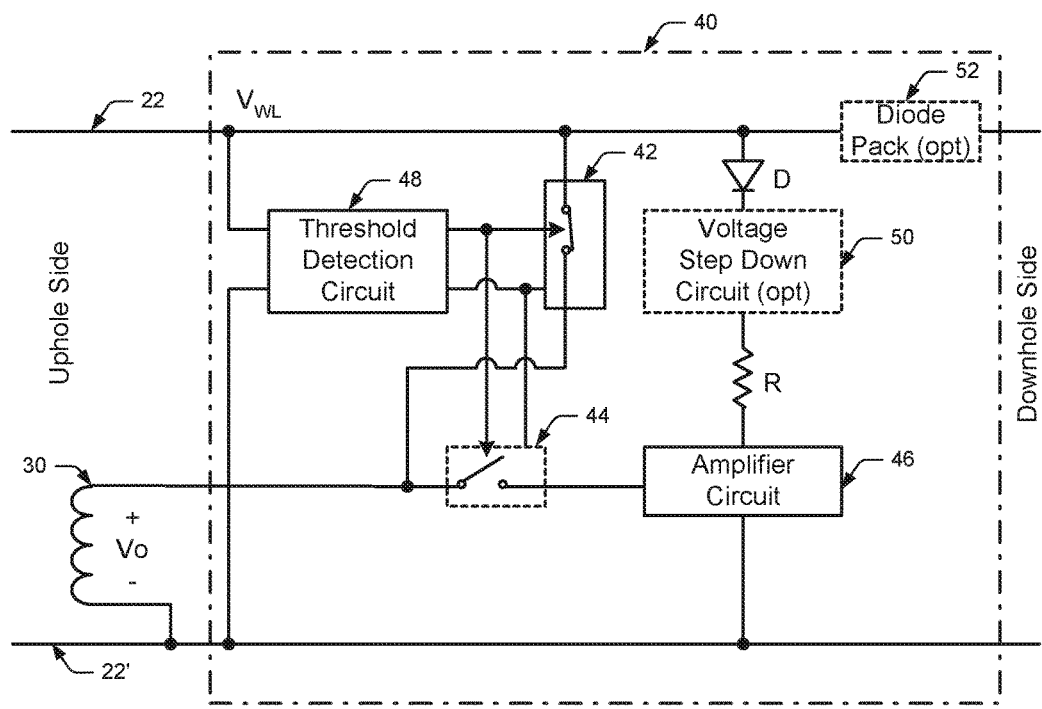
FIG. 3 is a block diagram illustrating exemplary components that may be included within the mode selection circuit shown in FIG. 2, according to one embodiment.

FIG. 3 is a block diagram illustrating one embodiment of the mode selection circuit 40 shown in FIG. 2. As shown in FIG. 3, mode selection circuit 40 may be coupled between a coil 30 of the CCL tool 20 and the wireline 22 and wireline return 22' of well survey system 10. According to one embodiment, mode selection circuit 40 may include a first switch 42 coupled between coil 30 and wireline 22, and an optional second switch 44 coupled between coil 30 and amplifier circuit 46. The first and second switches 42, 44 may comprise substantially any type of switches, including but not limited to, electromechanical relay switches and solid state relay switches. Although shown in FIG. 3, the second switch 44 may not be necessary, and may be omitted in some embodiments.

As shown in FIG. 3, mode selection circuit 40 includes a threshold detection circuit 48, which is generally configured for detecting a voltage ($V_{WL}$) on the wireline 22 and supplying signal(s) to the first switch 42 and the second switch 44 (if included) to selectively activate/deactivate the switch(es) depending on whether the detected voltage exceeds, or is less than, a threshold voltage. The threshold detection circuit 48 may generally include an input, which is coupled to detect a voltage on the wireline 22 and an output, which is coupled for controlling the first switch 42 and the second switch 44 (if included).

When CCL tool 20 is configured to operate in passive mode, the voltage on the wireline 22 may be about 0V. When configured to operate in active mode, power provided to the wireline 22 by surface equipment 26 may generate a wireline voltage between about 50V up to about 500 V at the tool string head. According to one embodiment, threshold detection circuit 48 may be configured to switch the operation of CCL tool 20 between passive and active modes, if the voltage detected on the wireline 22 exceeds a threshold voltage. Although not limited to such, the threshold voltage may range between about 10V and about 30V, and may be about 20V, in one example. However, the threshold voltage is not limited to any particular value, and may alternatively comprise any voltage magnitude deemed appropriate to switch the CCL tool operation between passive and active modes. In some embodiments, the threshold voltage may be set by characteristics of circuit elements included within threshold detection circuit 48 and first switch 42.

According to one embodiment, the first switch 42 may be a normally closed switch and the optional second switch 44 may be a normally open switch. In such an embodiment, an output voltage (Vo) signal generated across the coil 30 in response to a change in the magnetic flux field surrounding CCL tool 20 may be coupled to the wireline 22, unless a magnitude of a voltage detected on the wireline 22 is greater than (or equal to) the threshold voltage. In other words, CCL tool 20 may be initially configured to operate in passive mode, unless the voltage detected on the wireline 22 by the threshold detection circuit 48 is greater than (or equal to) the threshold voltage. If the detected voltage exceeds the threshold voltage, threshold detection circuit 48 may supply a signal to the first switch 42 to disconnect the coil 30 from the wireline 22. In some embodiments, disconnecting the coil 30 from the wireline causes the output voltage (Vo) generated across the coil to be supplied to the amplifier circuit 46. In other embodiments, threshold detection circuit 48 may supply a signal to the second switch 44 to connect the coil 30 to the amplifier circuit 46, if the second switch 44 is included in the mode selection circuit 40. In doing so, mode selection circuit 40 may switch the operation of CCL tool 20 from the passive to the active mode.

When CCL tool 20 is configured to operate in active mode, amplifier circuit 46 amplifies the magnitude of the current flowing into the amplifier circuit, which is induced by the output voltage (Vo) signal detected across the coil 30, before supplying the amplified detection signal to wireline 22. Although certainly not limited to such, amplifier circuit 46 may have a current gain of approximately 100 to 200 for amplifying the current magnitude, so that the amplified detection signal may be accurately detected by surface equipment 26. In some embodiments, one or more additional circuit elements may be coupled to amplifier circuit 46 for powering the amplifier, supplying the amplified detection signal to the wireline 22 and/or protecting the amplifier from high wireline voltages or high output voltages, which may be generated across the coil 30 of the CCL tool 20.

For example, a diode (D) and resistor (R) may be coupled between wireline 22 and amplifier circuit 46 for pulling current from the wireline and providing a supply voltage to the amplifier circuit 46. In some embodiments, an optional voltage step down circuit 50 may be included to protect the amplifier from relatively high wireline voltages. If included, the optional voltage step down circuit 50 may step the wireline voltage down to about 12V, in one example. On the other hand, if amplifier circuit 46 is able to withstand high wireline voltages without damage, voltage step down circuit 50 may be omitted, and amplifier circuit 46 can be connected to the wireline 22 through diode D1 and resistor R and powered by the wireline voltage. In other embodiments, a DC power supply (shown, e.g., in FIG. 4) may be included for supplying a power supply voltage to the amplifier circuit 46. In some embodiments, an optional voltage clipping circuit (shown, e.g., in FIG. 4) may be coupled between the coil 30 and amplifier circuit 46 to protect the amplifier when the output voltage (Vo) generated across the coil is too high.

In some embodiments, an optional diode pack 52 may be coupled to the wireline 22 on the downhole side of the CCL tool 20, as shown in FIG. 3. If included, diode pack 52 may prevent some conventional low resistance perforation detonators, which may be coupled to the wireline 22 on the downhole side of CCL tool 20, from shorting out the CCL detection signal in passive mode. Although illustrated in the embodiment of FIG. 3, diode pack 52 may not be necessary and may be omitted from other embodiments.

Figure 4:
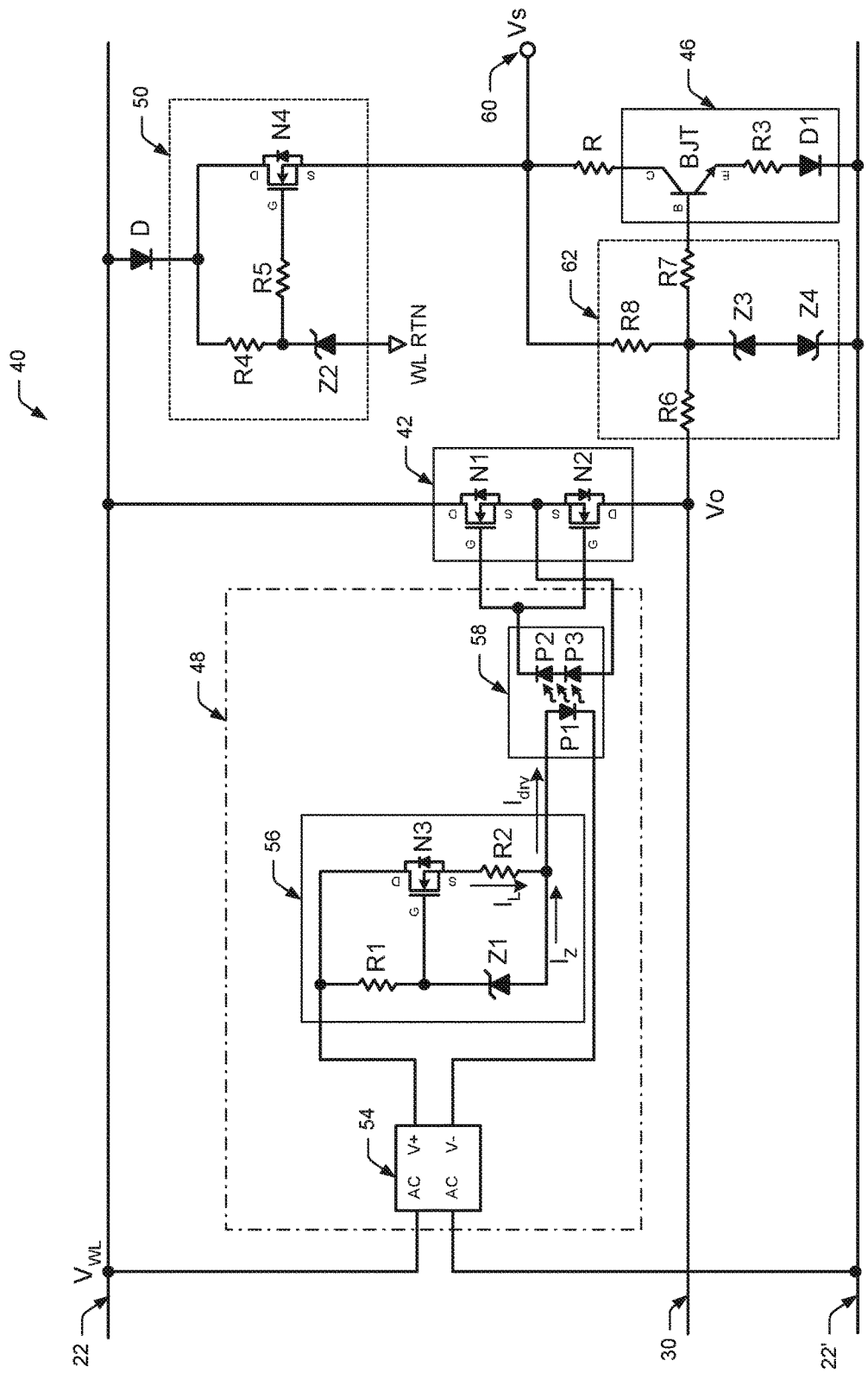
FIG. 4 is a circuit diagram illustrating exemplary circuit components that may be included within the mode selection circuit shown in FIG. 2, according to another embodiment.

FIG. 4 is a circuit diagram illustrating one embodiment of the mode selection circuit 40 shown in FIG. 2. Like the block diagram shown in FIG. 3, mode selection circuit 40 is illustrated in FIG. 4 as being coupled between coil 30 of CCL tool 20 and the wireline 22 and wireline return 22' of well survey system 10. In the circuit diagram shown in FIG. 4, mode selection circuit 40 is illustrated as including first switch 42, amplifier circuit 46, threshold detection circuit 48, and the optional voltage step down circuit 50. The second switch 44 depicted as an optional component in FIG. 3 is omitted, and a voltage clipping circuit 62 and DC power supply 60 are added in the embodiment of FIG. 4. Details of the circuit elements included within the exemplary circuit diagram shown in FIG. 4 are discussed in more detail below.

As noted above, first switch 42 may be an electromechanical relay switch or a solid state relay switch. In the embodiment of FIG. 4, first switch 42 is implemented with a pair of Metal-oxide Semiconductor Field Effect Transistors (MOSFETs), which are coupled in series between the voltage ($V_{WL}$) on wireline 22 and the output voltage (Vo) generated across the coil 30. More specifically, first switch 42 is illustrated as including a pair of depletion-mode N-channel MOSFETs (NMOS transistors) N1 and N2, which work together as one bi-directional, normally closed switch. When coupled with photovoltaic driver circuit 58, NMOS transistors N1, N2 provide a solid state relay switch. Although illustrated as such, the transistors included within first switch 42 are not strictly limited to serially coupled, depletion-mode NMOS transistors, or MOSFETs in general, and may be alternatively implemented with other types of electrical switches, in other embodiments.

A single MOSFET can only provide one-way current on/off switching, because the reverse current is by-passed by the body diode connected across the source and drain terminals. In order to provide bi-directional current flow on/off switching control, two MOSFETs (N1 and N2) are connected back-to-back in the solid state relay switch of FIG. 4 to prevent unintended current flow through the body diodes. In particular, the drain terminal of NMOS N1 is coupled to wireline 22, the source terminal of NMOS N1 is coupled to the source terminal of NMOS N2, and the drain terminal of NMOS N2 is coupled to coil 30. Because depletion-mode NMOS transistors are used, the first switch 42 is normally closed (i.e., "on" or capable of conducting current from source-to-drain) with gate-to-source voltages (Vgs) of +0V or more. In order to open the first switch 42, a negative Vgs may be supplied to the depletion-mode NMOS transistors shown in FIG. 4.

Although not strictly limited to such, driver circuit 58 is illustrated in FIG. 4 as a photovoltaic driver comprising photodiodes P1, P2 and P3. However, the inclusion of one photodiode (P1) on the input side and two photodiodes (P2 and P3) on the output side is merely representative of a photovoltaic driver. One skilled in the art would recognize that photovoltaic driver circuit 58 may include any number of photodiodes on the input and output sides.

On the output side of driver circuit 58, the negative output (depicted as the cathode of photodiode P2) is coupled to the gate terminals, and the positive output (depicted as the anode of photodiode P3) is coupled to the co-located source terminals of the NMOS transistors N1, N2 included within first switch 42. On the input side of driver circuit 58, the negative input (depicted as the cathode of photodiode P1) is coupled to a negative output terminal of a bridge rectifier circuit 54, and the positive input (depicted as the anode of photodiode P1) is coupled to a current limiting circuit 56. According to one embodiment, bridge rectifier circuit 54, current limiting circuit 56 and photovoltaic driver circuit 58 are used to implement the threshold detection circuit 48 shown in block diagram form in FIG. 3. It is noted, however, that threshold detection circuit 48 is not strictly limited to the particular circuit implementation shown in FIG. 4, and may be alternatively implemented in other embodiments.

In the embodiment of FIG. 4, bridge rectifier circuit 54 is coupled to the wireline 22 and wireline return 22' for converting an AC voltage or a negative DC voltage on the wireline to a positive-DC voltage, which may range between about 0 $V_{DC}$ up to about 500 $V_{DC}$ depending on whether CCL tool 20 is configured to operate in passive or active mode. The +DC voltage (+V) output from bridge rectifier circuit 54 is supplied to current limiting circuit 56, and the −DC voltage (−V) is coupled to the cathode of photodiode P1 on the input side of photovoltaic driver circuit 58.

In addition to providing a DC voltage, bridge rectifier circuit 54 enables the threshold detection circuit 48 to operate regardless of the polarity of the wireline voltage. Although the bridge rectifier circuit may be needed in some embodiments, it may not be needed in others. For example, bridge rectifier circuit 54 may generally be needed when CCL tool 20 is used during perforation operations, since positive or negative DC voltages may be used to detonate the explosive charges. On the other hand, bridge rectifier circuit 54 may not be needed when only single polarity DC voltages are supplied to the wireline, as may occur when CCL tool 20 is used for logging and certain perforation operations. However, since the intent of the present disclosure is to provide a dual-mode CCL tool 20 capable of use for both perforation and logging operations without the limitation of power polarity, bridge rectifier circuit 54 may be included in preferred embodiments.

In the embodiment of FIG. 4, current limiting circuit 56 is illustrated as including a diode regulator, which is coupled in parallel with an NMOS transistor (N3) and current setting resistor (R2). As shown in FIG. 4, the diode regulator includes a current limiting resistor (R1) coupled in series with a Zener diode (Z1), which permits current to flow in the reverse direction ($I_Z$) when its reverse-bias breakdown voltage (i.e., Zener voltage) is exceeded. The resistance of R1 is chosen to limit the maximum current flowing through Z1, so that a stabilized output voltage substantially equal to the Zener voltage is generated across Z1 regardless of varying source and load conditions. The stabilized output voltage generated across Z1 is supplied to the gate terminal of NMOS transistor N3 to turn on N3. Once NMOS transistor N3 is turned on, a current flowing ($I_L$) across R2 generates a voltage drop across R2, which in turn, lowers the gate-to-source voltage ($V_{GS}$) of N3. When the turn-on effect of Z1 and the turn-off effect of current flowing through R2 reaches a balance point, the drive current (Idrv) provided to driver circuit 58 is regulated. In one example, the resistance of R1 may be about 50-60 kΩ, the Zener voltage of Z1 may be about 4.8-5.4V, the turn-on voltage of N3 may be about 2V and the resistance of R2 may be about 50-150Ω. It is noted, however, that the values for R1, Z1, N3 and R2 are provided for illustrative purposes only, and are not restricted to the values specifically disclosed herein.

According to one embodiment, a drive current (Idrv) insufficient to activate photodiode P1 may be supplied to driver circuit 58 when current limiting circuit 56 is presented with a +DC voltage (+V) less than or equal to about 10V. As used herein, the term "insufficient to activate" means that the drive current (Idrv) supplied to photodiode P1 is less than the turn-on current specified for photodiode P1. In one example, the turn-on current specified for P1 may be approximately 10 mA. With insufficient current, the photodiode P1 on the input side of driver circuit 58 will not conduct to the photodiodes P2, P3 on the output side of driver circuit 58, thereby causing the first switch 42 to remain in its normally closed state.

As the +DC voltage supplied to the current limiting circuit 56 increases, a reverse current ($I_Z$) may start to flow through Z1 once the Zener voltage is exceeded, causing a voltage greater than the turn-on voltage of N3 to be supplied to the gate terminal of N3. When this occurs, the current ($I_L$) through R2 combines with the reverse current ($I_Z$) to provide a drive current (Idrv) to driver circuit 58. If the drive current is sufficient to activate P1 (i.e., exceeds the turn-on current specified for P1), photons emitted by P1 on the input side of driver circuit 58 may be detected by the photodiodes on the output side of driver circuit 58. If the detected photons are sufficient to activate the photodiodes on the output side, a voltage is supplied to the gate terminals of the depletion-mode NMOS transistors N1, N2 included within first switch 42. If this voltage results in a negative gate-to-source voltage (−Vgs) greater than the turn-on voltage of NMOS transistors N1, N2, the NMOS transistors will be activated to open the normally-closed first switch 42.

As noted above, the threshold voltage at which threshold detection circuit 48 opens or disconnects first switch 42 from the wireline 22 may be set by characteristics of circuit elements included within threshold detection circuit 48 and characteristics of the NMOS transistors N1, N2 included within first switch 42. These characteristics may generally include the resistance value of the current limiting resistor R1, the resistance value of the current setting resistor R2, the turn-on current of the photovoltaic driver 58, and the turn-off voltage of the depletion mode NMOS transistors N1, N2 included within first switch 42. According to one embodiment, values for R1, R2, P1-P3, N1 and N2 may be selected so as to provide a threshold voltage within a range of about 10V to about 30V. In one example, the values for R1, R2, P1-P3, N1 and N2 may be selected so as to provide a threshold voltage of about 20V. In some embodiments, the threshold voltage may be modified by changing the resistance value of the current setting resistor R2 to thereby change the amount of drive current (Idrv) supplied to the driver circuit 58 by the current limiting circuit 56.

As noted above, the wireline voltage may go as high as +/−500V in some situations. In addition to controlling the operation of the solid state relay switch, current limiting circuit 56 may function to protect driver circuit 58 when the wireline voltage is too high. As the wireline voltage increases, the current ($I_L$) flowing through R2 increases. The increase in current decreases the Vgs voltage across transistor N3, and therefore, the current flowing through transistor N3 to reduce the drive current (Idrv) supplied to the driver circuit 58. The drive current is progressively reduced with increasing wireline voltages until a regulated current is reached.

When first switch 42 is opened to disconnect the coil 30 from the wireline 22 in the embodiment of FIG. 4, a current induced by the output voltage (Vo) generated across the coil 30 is supplied to the amplifier circuit 46. In general, amplifier circuit 46 may be configured to amplify the magnitude of the current induced by the output voltage before supplying the amplified detection signal to the wireline 22 via resistor R and diode D.

In the embodiment of FIG. 4, amplifier circuit 46 is illustrated as including an n-p-n Bipolar Junction Transistor (BJT), resistor R3 and diode D1. In particular, the base terminal of the BJT is shown as being coupled for receiving the current induced from the output voltage (Vo) generated across coil 30, the collector terminal of the BJT is shown as being coupled to the resistor R shown also in FIG. 3, and the emitter terminal of the BJT is shown as being coupled to resistor R3. The cathode of D1 is coupled to wireline return 22'. Although illustrated in FIG. 4 as an n-p-n BJT, amplifier circuit 46 is not limited to bipolar junction technology and may be alternatively implemented with another type of transistor technology (e.g., MOSFET, or an operational amplifier configured as a current amplifier).

Certain characteristics of the amplifier circuit 46 may be selected for amplifying the magnitude of the current signal generated from the coil when the magnet flux is disturbed, so that the amplified detection signal supplied to the wireline 22 may be accurately detected by surface equipment 26. In one example, the turn-on voltage of BJT may be about 0.7V, the resistance of R3 may be about 50-150Ω and the diode voltage of D1 may be about 0.5V to block noise signals below approximately 1.2V from being amplified and detected by the surface equipment. The amplifier gain is generally defined or set by a characteristic of the BJT. In the example embodiment of FIG. 4, the amplifier gain may be approximately 100 to 200. It is noted, however, that the values for BJT, R3 and D1 are provided for illustrative purposes only, and are not restricted to only the values specifically disclosed herein. It is further noted that although illustrated in the example embodiment of FIG. 4, resistor R3 and diode D1 are optional components of amplifier circuit 46. In one alternative embodiment, amplifier circuit 46 may include resistor R3, but not diode D1. In another alternative embodiment, diode D1 may be included within amplifier circuit 46, and resistor R3 may be omitted.

As noted above with respect to FIG. 3, an optional voltage step down circuit 50 may be included within the mode selection circuit 40 for providing power to the amplifier circuit 46 and/or for protecting the amplifier from high wireline voltages. FIG. 4 provides one exemplary implementation of the optional voltage step down circuit 50 shown in block diagram form in FIG. 3. In the embodiment of FIG. 4, voltage step down circuit 50 includes a diode regulator comprising a current limiting resistor (R4) and Zener diode (Z2). The cathode of Z2 is coupled through resistor R5 to the gate terminal of NMOS transistor N4, while the anode of Z2 is coupled to the wireline return 22'. If the voltage on wireline 22 exceeds a predetermined voltage (e.g., about 15V), voltage step down circuit 50 may reduce the voltage on the wireline before supplying a reduced voltage (e.g., about 12V) to the power supply input of the amplifier.

Certain characteristics of R4, Z2, R5 and N4 may be selected so as to provide an appropriate supply voltage to amplifier circuit 46 (e.g., about 12V) and/or to protect the amplifier from high wireline voltages. In one example, the resistance of R4 may be about 230-250 kΩ, the Zener voltage of Z2 may be about 11.7-12.4V, the resistance of R5 may be about 50-150Ω and the turn-on voltage of N4 may be about 2-4V. It is noted, however, that the values for R4, Z2, N4 and R5 are provided for illustrative purposes only, and are not restricted to only the values specifically disclosed herein.

Although illustrated in FIGS. 3 and 4, voltage step down circuit 50 may not be included in all embodiments. If amplifier circuit 46 is able to withstand high wireline voltages without damage, the voltage step down circuit 50 depicted as an optional component in FIGS. 3 and 4 may be omitted. In some embodiments, the power supply input of the amplifier circuit 46 may be connected to the wireline 22 through resistor R and diode D for receiving the wireline voltage. In other embodiments, a DC power supply 60 may be coupled to the power supply input for supplying a power supply voltage to the amplifier, as shown in the embodiment of FIG. 4. In one example, the DC power supply 60 may be a linear 12V power supply coupled for supplying approximately 12 $V_{DC}$ to the power supply input of amplifier circuit 46.

In some embodiments, a voltage clipping circuit 62 may be coupled between coil 30 of CCL tool 20 and amplifier circuit 46 to protect the amplifier when the output voltage (Vo) generated across the coil is too high. If the output voltage (Vo) generated across the coil 30 exceeds a predetermined voltage (e.g., +/−5V), voltage clipping circuit 62 may clip the output voltage and supply a clipped voltage to the base terminal of the BJT (i.e., the detection signal input of the amplifier circuit 46). In order to handle positive or negative output voltages, voltage clipping circuit 62 may include a pair of back-to-back Zener diodes Z3, Z4 coupled between the coil 30 and the wireline return 22'. The Zener voltage of Z3 and Z4 may be selected to set the clipping voltage, which in one embodiment, may be about +/−5V. In the illustrated embodiment, resistor R6 limits the current flow into the amplifier circuit 46, resistors R6 and R7 set the input impedance of the amplifier circuit, and resistor R8 (optional) sets the input voltage bias of the amplifier circuit.

In some embodiments, an optional second switch 44 (not shown in FIG. 4) may be included between the output voltage (Vo) node and resistor R6 of voltage clipping circuit 62 (if included), or alternatively, between the Vo node and the base terminal of the BJT within amplifier circuit 46 (i.e., the detection signal input of the amplifier circuit 46). If included, the second switch 44 may be a solid state relay switch similar to the photovoltaic driver circuit 58 and serially-coupled NMOS transistors N1, N2 used to implement first switch 42.

Instead of depletion mode MOSFETs, however, the optional second switch 44 may include a pair of serially-coupled, enhancement mode MOSFETs (NMOS or PMOS), so as to configure the second switch 44 as a normally open switch. If a second switch were included, the drain terminals of the enhancement-mode MOSFETs would be coupled between the Vo node and the detection signal input of amplifier circuit 46 (or between resistor R6 of voltage clipping circuit 62, if included). The gate terminals of the enhancement-mode MOSFETs would be coupled to the positive output of a second photovoltaic driver and the source terminals of the enhancement-mode MOSFETs would be coupled to the negative output of the second photovoltaic driver. The second photovoltaic driver would be coupled to the bridge rectifier 54 and current limiting circuit 56, as shown in FIG. 4 and described above for driver circuit 58. When enhancement-mode MOSFETs (NMOS or PMOS) are used, the second switch 44 may be normally open (i.e., "off" or incapable of conducting current from source-to-drain) with gate-to-source voltages (Vgs) of +0V or more. In order to close the second switch 44, a negative gate-to-source voltage (−Vgs) may be supplied to the MOSFETs when enhancement-mode PMOS transistors are used within the second switch. Alternatively, a positive Vgs (+Vgs) may be supplied to the MOSFETs when enhancement-mode NMOS transistors are used to close the normally open second switch 44.

Figure 5:
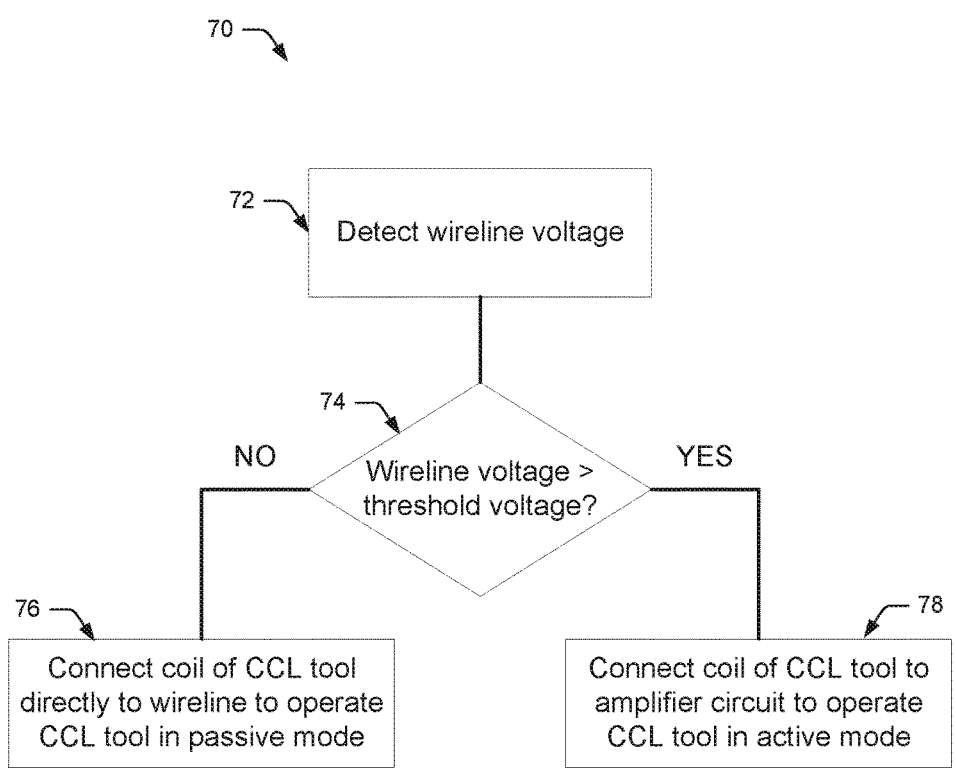
FIG. 5 is a flowchart diagram illustrating one embodiment of a method for selectively operating a dual-mode CCL tool in either an active mode or a passive mode.

FIG. 5 is a flowchart diagram illustrating one embodiment of a method 70 for selectively operating a dual-mode CCL tool in either an active or passive mode. In general, method 70 may be performed when the CCL tool is disposed within a cased well for detecting magnetic anomalies in the surrounding environment. In some embodiments, method 70 may be performed while conducting other downhole operations including, but not limited to, wireline logging and perforation of the well casing. As such, method 70 may be used to select the CCL tool mode of operation (i.e., passive or active mode), which is preferred for a given downhole operation. As noted above, a passive mode of operation may be preferred during perforation jobs, whereas an active mode of operation may be preferred during wireline logging operations. Although not limited to such, method 70 may be performed by one or more embodiments of the mode selection circuit 40 shown in FIGS. 2-4.

According to one embodiment, method 70 may generally begin by detecting a voltage on the wireline (step 72) and comparing the wireline voltage to a threshold voltage (step 74). As noted above, a voltage may be supplied to the wireline 22 from surface equipment 26 when the dual-mode CCL tool is configured to be operated in active mode, or when firing perforation guns. The threshold voltage may comprise any voltage magnitude deemed appropriate to switch the CCL tool operation between passive and active modes. In some embodiments, the threshold voltage may range between about 10V and about 30V, and may be about 20V, in one example.

If the detected voltage is less than the threshold voltage (NO branch of step 74), the coil of the dual-mode CCL tool may be connected directly to the wireline to operate the dual-mode CCL tool in passive mode (step 76). In one example, the coil may be connected directly to the wireline by closing a first switch, which is coupled between the wireline and the coil of the CCL tool. According to one embodiment, the first switch may be a normally closed switch. In such an embodiment, the coil may be connected directly to the wireline by maintaining the normally closed position of the first switch when the detected voltage is less than the threshold voltage.

If the detected voltage is greater than or equal to the threshold voltage (YES branch of step 74), the coil of the dual-mode CCL tool may be connected to an amplifier circuit to operate the dual-mode CCL tool in active mode (step 78). According to one embodiment, if the detected voltage is greater than or equal to the threshold voltage, the coil may be connected to the amplifier circuit by opening the first switch. According to another embodiment, if the detected voltage is greater than or equal to the threshold voltage, the coil may be connected to the amplifier circuit by opening the first switch and closing a second switch, which is coupled between the coil of the CCL tool and the amplifier circuit.

It will be appreciated to those skilled in the art having the benefit of this disclosure that this disclosure is believed to provide various embodiments of dual-mode CCL tools, circuits and methods, which enable a CCL tool to selectively operate in passive or active mode. As set forth above, a CCL tool may be configured to selectively operate in a passive or active mode by providing a mode selection circuit 40 between the coil 30 of a CCL tool 20 and the wireline 22 of a well survey system 10. The addition of mode selection circuit 40 converts a once passive CCL tool into a dual-mode CCL tool and enables a single CCL tool to be used for different downhole operations, which typically require different types of CCL tools.

In addition to reducing the costs typically associated with purchasing and maintaining different types of CCL tools, the dual-mode CCL tool and mode selection circuit described herein may enable the CCL tool operation to be reconfigured "on-the-fly" and as needed, while the tool remains downhole. In one example, the dual-mode CCL tool may be initially configured to operate in active mode for performing logging operations, and then reconfigured while still downhole into the passive mode of operation if a perforation is to be performed somewhere within the well. This can be achieved in the embodiments described herein simply by detecting a voltage ($V_{WL}$) on the wireline 22 and supplying signal(s) to the first switch 42 and the second switch 44 (if included) to selectively activate/deactivate the switch(es) depending on whether the detected voltage exceeds, or is less than, a threshold voltage.

By providing the ability to disconnect the coil 30 from the wireline 22 (i.e., by opening the normally closed first switch 42), the mode selection circuit described herein may provide an additional advantage of reducing the current draw, which would otherwise be applied to the coil 30 from surface equipment 26 when performing perforation jobs. This may help to reduce wireline cable loss during such jobs, thereby enabling longer cables to be used for perforating deeper wells. Additional advantages provided by mode selection circuit 40 may be apparent to one skilled in the art in view of this disclosure.

It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims. As used herein, the terms "approximately" and "about" refer to variations of up to +/−5% of the stated number. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention.

What is claimed is:

1. A circuit coupled between a coil of a casing collar locating (CCL) tool and a wireline of a well survey system, the circuit comprising:
   a first switch coupled between the wireline and the coil of the CCL tool; and
   a threshold detection circuit having an input coupled to detect a voltage on the wireline and having an output coupled to the first switch, wherein if the detected voltage exceeds a threshold voltage, the threshold detection circuit is configured to supply a signal to the first switch to disconnect the coil from the wireline.

2. The circuit as recited in claim 1, wherein the first switch is a normally closed switch.

3. The circuit as recited in claim 1, wherein if the detected voltage does not exceed the threshold voltage, a detection signal proportional to an output voltage generated across the coil is supplied to the wireline via the first switch.

4. The circuit as recited in claim 1, wherein the threshold voltage is selected from a range of voltages between approximately 10V and approximately 30V.

5. The circuit as recited in claim 1, wherein the threshold detection circuit comprises:
   a rectifier circuit coupled to the wireline for converting the voltage on the wireline to a positive direct current (DC) voltage;
   a current limiting circuit coupled for receiving the positive DC voltage from the rectifier circuit and configured for generating a drive current; and
   a driver circuit coupled for receiving the drive current from the current limiting circuit and configured for supplying the signal to the first switch to disconnect the coil from the wireline, only if the drive current is sufficient to activate the driver circuit.

6. The circuit as recited in claim 5, wherein the threshold voltage is determined by the drive current generated by the current limiting circuit, a turn-on characteristic of the driver circuit and a turn-on characteristic of the first switch.

7. The circuit as recited in claim 1, further comprising an amplifier circuit coupled between the wireline and the coil of the CCL tool.

8. The circuit as recited in claim 7, wherein if the signal is supplied to the first switch to disconnect the coil from the wireline, the amplifier circuit is configured to supply an amplified detection signal to the wireline that is proportional to an output voltage generated across the coil.

9. The circuit as recited in claim 7, further comprising a second switch coupled between the coil of the CCL tool and the amplifier circuit.

10. The circuit as recited in claim 9, wherein the first switch is a normally closed switch and the second switch is a normally open switch.

11. The circuit as recited in claim 10, wherein if the detected voltage exceeds the threshold voltage, the threshold detection circuit is configured to supply a first signal to the first switch to disconnect the coil from the wireline and a second signal to the second switch to connect the coil to the amplifier circuit.

12. The circuit as recited in claim 7, further comprising a voltage clipping circuit coupled between the coil and the amplifier circuit, wherein if an output voltage generated across the coil exceeds a predetermined voltage, the voltage clipping circuit is configured to clip the output voltage and supply the clipped voltage to a detection signal input of the amplifier circuit.

13. The circuit as recited in claim 7, further comprising a voltage step down circuit coupled between the wireline and the amplifier circuit, wherein if the voltage on the wireline exceeds a predetermined voltage, the voltage step down circuit is configured to reduce the voltage on the wireline before supplying the reduced voltage to a power supply input of the amplifier.

14. The circuit as recited in claim 7, further comprising a DC power supply coupled for supplying a voltage to a power supply input of the amplifier.

15. A method for selectively operating a casing collar locating (CCL) tool in an active mode or a passive mode, the method comprising:
   detecting a voltage on a wireline coupled to the CCL tool;
   connecting a coil of the CCL tool to the wireline to operate the CCL tool in the passive mode, if the detected voltage is less than a threshold voltage; and
   connecting the coil of the CCL tool to an amplifier circuit to operate the CCL tool in the active mode, if the detected voltage is greater than or equal to the threshold voltage.

16. The method as recited in claim 15, wherein if the detected voltage is less than the threshold voltage, the step of connecting the coil of the CCL tool to the wireline comprises closing a first switch, which is coupled between the wireline and the coil of the CCL tool.

17. The method as recited in claim 16, wherein if the detected voltage is greater than or equal to the threshold voltage, the step of connecting the coil of the CCL tool to the amplifier circuit comprises opening the first switch to connect the coil of the CCL tool to the amplifier circuit.

18. The method as recited in claim 16, wherein if the detected voltage is greater than or equal to the threshold voltage, the step of connecting the coil of the CCL tool to the amplifier circuit comprises opening the first switch and closing a second switch, which is coupled between the coil of the CCL tool and the amplifier circuit.

19. A casing collar locating (CCL) tool coupled to a wireline of a well survey system, the CCL tool comprising:
   at least one magnet and at least one coil arranged next to the at least one magnet; and
   a mode selection circuit coupled between the at least one coil and the wireline, wherein the mode selection circuit is configured to:
   detect a voltage on the wireline;
   connect the at least one coil to the wireline, if the detected voltage is less than a threshold voltage; and
   connect the at least one coil to an amplifier circuit, if the detected voltage is greater than or equal to the threshold voltage.

20. The CCL tool as recited in claim 19, wherein the mode selection circuit comprises:
   a first switch coupled between the wireline and the at least one coil of the CCL tool; and
   a threshold detection circuit having an input coupled to detect the voltage on the wireline and having an output coupled to the first switch, wherein the threshold detection circuit is configured to:
   maintain the first switch in a normally closed position to connect the at least one coil to the wireline if the detected voltage is less than a threshold voltage; and supply a signal to the first switch to disconnect the at least one coil from the wireline if the detected voltage exceeds the threshold voltage.

21. The CCL tool as recited in claim 19, wherein the mode selection circuit comprises:
a first switch coupled between the wireline and the at least one coil of the CCL tool;
a second switch coupled between the at least one coil of the CCL tool and the amplifier circuit; and
a threshold detection circuit having an input coupled to detect the voltage on the wireline and having an output coupled to the first switch and the second switch, wherein if the detected voltage exceeds a threshold voltage, the threshold detection circuit is configured to supply a first signal to the first switch to disconnect the at least one coil from the wireline and a second signal to the second switch to connect the at least one coil to the amplifier circuit.

22. The CCL tool as recited in claim 19, wherein if the detected voltage is less than the threshold voltage, a detection signal proportional to an output voltage generated across the at least one coil is supplied to the wireline via a first switch coupled between the wireline and the at least one coil of the CCL tool.

23. The CCL tool as recited in claim 19, further comprising the amplifier circuit, which is coupled between the wireline and the at least one coil of the CCL tool, wherein if the detected voltage is greater than or equal to the threshold voltage, the amplifier circuit is configured to supply an amplified detection signal to the wireline that is proportional to an output voltage generated across the at least one coil.

24. The CCL tool as recited in claim 19, wherein the at least one coil consists of only one coil.

* * * * *